(12) United States Patent
Popov et al.

(10) Patent No.: US 12,481,785 B2
(45) Date of Patent: Nov. 25, 2025

(54) ELECTRONIC DEVICE AND METHOD OF OPERATING THE SAME

(71) Applicant: Samsung Electronics Co., Ltd., Suwon-si (KR)

(72) Inventors: Artem Popov, Kyiv (UA); Oleksandr Popov, Kyiv (UA); Stanislav Pedan, Kyiv (UA); Andrii Astrakhantsev, Kyiv (UA); Ivan Shapoval, Kyiv (UA); Oleg Konoval, Kyiv (UA); Serhii Tverdokhlib, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/163,589

(22) Filed: Feb. 2, 2023

(65) Prior Publication Data
US 2023/0259652 A1    Aug. 17, 2023

Related U.S. Application Data

(63) Continuation of application No. PCT/KR2023/000166, filed on Jan. 4, 2023.

(30) Foreign Application Priority Data

Feb. 11, 2022    (KR) .................. 10-2022-0017989

(51) Int. Cl.
*G06F 21/62*    (2013.01)
*G09G 5/00*    (2006.01)
*H04N 21/454*    (2011.01)

(52) U.S. Cl.
CPC ......... *G06F 21/6245* (2013.01); *G09G 5/003* (2013.01); *H04N 21/4542* (2013.01); *G09G 2358/00* (2013.01)

(58) Field of Classification Search
None
See application file for complete search history.

(56) References Cited

U.S. PATENT DOCUMENTS

| | | | |
|---|---|---|---|
| 7,693,330 | B2 | 4/2010 | So |
| 9,076,231 | B1 | 7/2015 | Hill et al. |
| (Continued) | | | |

FOREIGN PATENT DOCUMENTS

| | | |
|---|---|---|
| CN | 112492103 A | 3/2021 |
| CN | 113378246 A | 9/2021 |
| (Continued) | | |

OTHER PUBLICATIONS

International Search Report dated Mar. 31, 2023, issued in International Application No. PCT/KR2023/000166.
(Continued)

*Primary Examiner* — James R Marandi
(74) *Attorney, Agent, or Firm* — Jefferson IP Law, LLP

(57) ABSTRACT

An electronic device is provided. The electronic device includes a display and at least one processor operatively coupled to the display. The at least one processor may be configured to, when displaying content on the display, execute a personal information protection mode, identify a type of the content displayed on the display, copy the content into a plurality of frames, modify each of at least some of the plurality of frames based on the identified type of the content, and display a video obtained by merging the plurality of frames including the at least some modified frames on the display.

8 Claims, 9 Drawing Sheets

(56) References Cited

U.S. PATENT DOCUMENTS

| | | | |
|---|---|---|---|
| 9,285,981 | B1 | 3/2016 | Leavy et al. |
| 9,348,984 | B2 | 5/2016 | Peled et al. |
| 2010/0259560 | A1 | 10/2010 | Jakobson et al. |
| 2012/0131471 | A1 | 5/2012 | Terlouw et al. |
| 2014/0327634 | A1 | 11/2014 | Kim et al. |
| 2015/0009248 | A1* | 1/2015 | Bracalente .............. H04N 5/913 345/691 |
| 2015/0213274 | A1 | 7/2015 | Xu et al. |
| 2015/0310655 | A1* | 10/2015 | Hill ........................ G06F 3/0482 345/647 |
| 2016/0012625 | A1 | 1/2016 | Schnelle |
| 2016/0253508 | A1 | 9/2016 | Song |
| 2017/0323099 | A1 | 11/2017 | Song |
| 2019/0129601 | A1 | 5/2019 | Bae et al. |
| 2021/0192671 | A1 | 6/2021 | Seo et al. |

FOREIGN PATENT DOCUMENTS

| | | |
|---|---|---|
| JP | 3577455 B2 | 10/2004 |
| JP | 2006-221560 A | 8/2006 |
| KR | 10-2012-0113167 A | 10/2012 |
| KR | 10-2015-0078892 A | 7/2015 |
| KR | 10-2015-0090840 A | 8/2015 |
| KR | 10-2018-0058463 A | 6/2018 |
| KR | 10-2019-0143007 A | 12/2019 |
| KR | 10-2021-0030874 A | 3/2021 |
| KR | 10-2356345 B1 | 1/2022 |
| WO | 2017/049221 A1 | 3/2017 |

OTHER PUBLICATIONS

CAPEC-508: Shoulder Surfing (Version 3.9), Oct. 21, 2021, https://capec.mitre.org/data/definitions/508.html.

LifeLock Official Site, Identity Theft Protection, Identity theft can happen easily. LifeLock makes protection easy, too. https://www.lifelock.com/learn-identity-theft-resources-police-departments-report-fresh-cases-of-shoulder-surfing.html, Retrieved on Dec. 22, 2022.

Amar Toor, Automated shoulder surfing makes it easier to steal passwords, isn't very tubular, brah (video), Jul. 15, 2011, https://www.engadget.com/2011-07-15-automated-shoulder-surfing-makes-it-easier-to-steal-passwords-i.html.

Marco Pruess, New Security Risks Await Post-Pandemic Travelers, Feb. 10, 2021, https://securityboulevard.com/2021/02/new-security-risks-await-post-pandemic-travelers.

Lance Whitney, How your remote employees may be sharing sensitive data, Mar. 10, 2021, https://www.techrepublic.com/article/how-your-remote-employees-may-be-sharing-sensitive-data.

Interfax-Ukraine, Servant of the People to discuss scandal around Yaremenko next week, Nov. 1, 2019.

\* cited by examiner

ELECTRONIC DEVICE AND METHOD OF OPERATING THE SAME

CROSS-REFERENCE TO RELATED APPLICATION(S)

This application is a continuation application, claiming priority under § 365(c), of an International application No. PCT/KR2023/000166, filed on Jan. 4, 2023, which is based on and claims the benefit of a Korean patent application number 10-2022-0017989, filed on Feb. 11, 2022, in the Korean Intellectual Property Office, the disclosure of which is incorporated by reference herein in its entirety.

TECHNICAL FIELD

The disclosure relates to an electronic device and a method of operating the same. More particularly, the disclosure relates to an electronic device for displaying content on a screen and a method of operating the same.

BACKGROUND ART

Along with the recent increase of use of electronic devices, the problem of personal information leakage caused by content sharing through electronic devices has been serious. In addition, even if users do not share content, shoulder surfing attacks are increasing, in which a malicious attacker in the vicinity illegally captures content displayed on the screen of an electronic device to obtain personal information. Shared data or illegally captured data may be re-shared or used regardless of a user's intention, and thus a method of preventing it is required.

In government-related applications or applications such as mobile banking, measures such as inserting a watermark or disabling a screen shot function are taken to prevent unauthorized theft and leakage of personal information. To protect personal information of content even in the case of an application that does not provide these functions, a method of protecting content in an electronic device is required.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device for modifying content and displaying the modified content to prevent unauthorized sharing or duplication of the content when the electronic device displays the content on a screen, and a method of operating the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, and at least one processor operatively coupled to the display. The at least one processor may be configured to, when displaying content on the display, execute a personal information protection mode, identify a type of the content displayed on the display, copy the content into a plurality of frames, modify each of at least some of the plurality of frames based on the identified type of the content, and display a video obtained by merging the plurality of frames including the at least some modified frames on the display.

In accordance with another aspect of the disclosure, a method of operating an electronic device is provided. The method includes, when displaying content on a display, executing a personal information protection mode, identifying a type of the content displayed on the display, copying the content into a plurality of frames, modifying each of at least some of the plurality of frames based on the identified type of the content, and displaying a video obtained by merging the plurality of frames including the at least some modified frames on the display.

Advantageous Effects

An electronic device and a method of operating the same according to various embodiments of the disclosure may prevent unauthorized sharing or duplication of content by modifying the content and displaying the modified content according to the type of the content, when the electronic device displays the content on a screen.

An electronic device and a method of operating the same according to various embodiments of the disclosure may prevent unauthorized sharing or duplication of content by displaying user information about the electronic device in shared content, when the electronic device displays the shared content on a screen.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
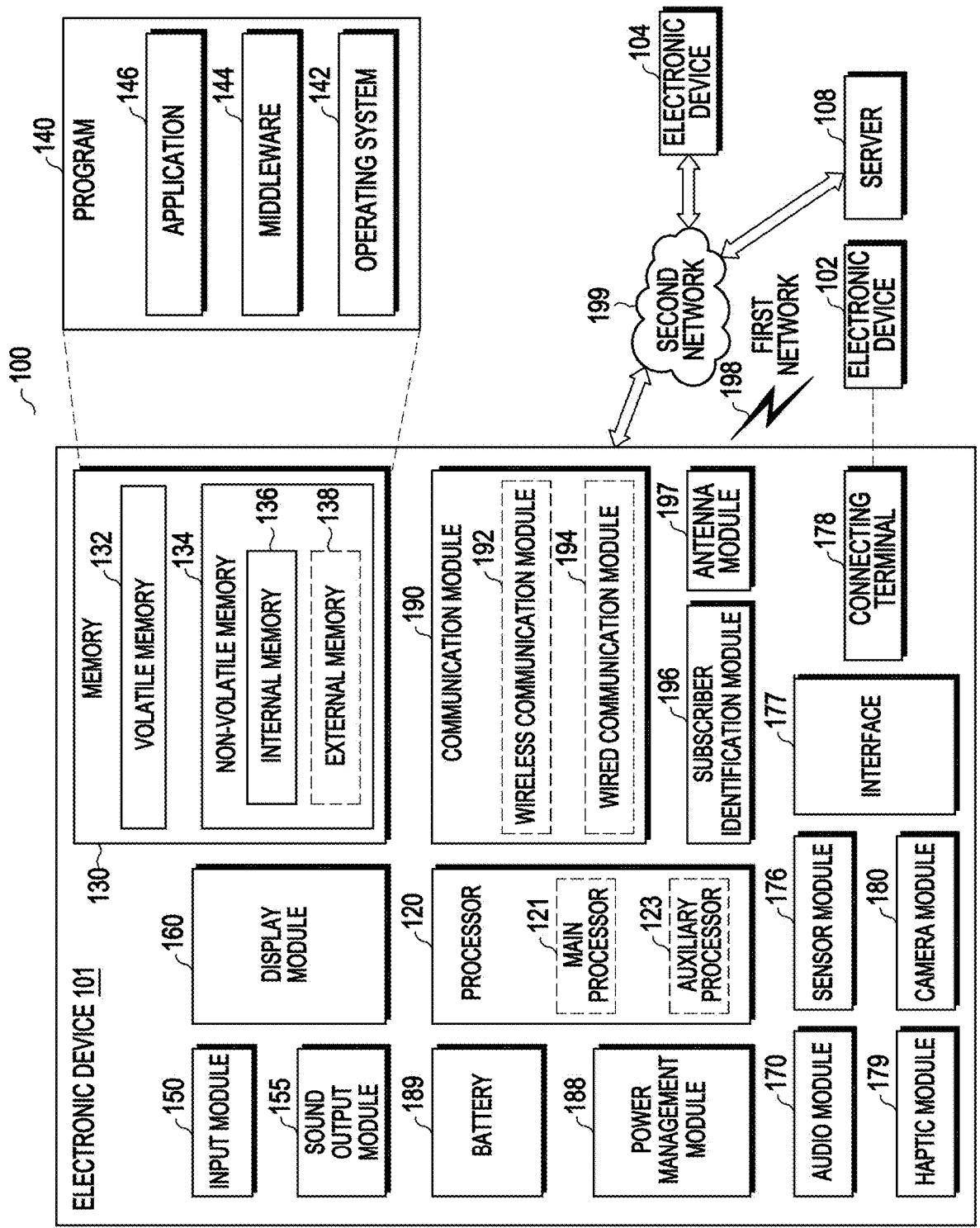
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
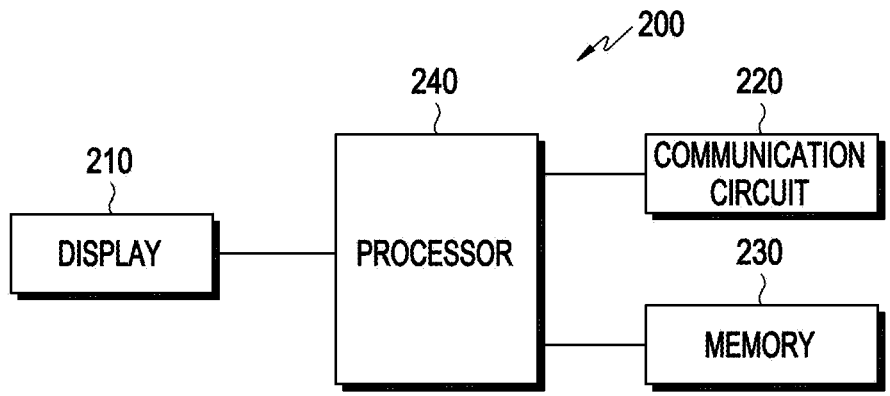
FIG. 2 is a block diagram illustrating an electronic device according to an embodiment of the disclosure.

FIG. 2 is a block diagram illustrating an electronic device according to an embodiment of the disclosure.

Referring to FIG. 2, the electronic device 200 (e.g., the electronic device 101 of FIG. 1) may include a display 210, a communication circuit 220, memory 230, and/or a processor 240.

In an embodiment, the display 210 may display various types of content on a touch screen under the control of the processor 240. In an embodiment, the display 210 may display information generated by the processor 240 and information transmitted and/or received through the communication circuit 220 under the control of the processor 240. In an embodiment, the display 210 may be included in the display module 160 of FIG. 1.

In an embodiment, the communication circuit 220 may communicate with an external electronic device (e.g., the electronic device 102 or the electronic device 104 of FIG. 1) using various communication schemes. In an embodiment, the communication circuit 220 may receive various types of content from the external electronic device under the control of the processor 240. In an embodiment, the communication circuit 220 may be included in the communication module 190 of FIG. 1.

In an embodiment, the memory 230 may store the information transmitted and/or received through the communication circuit 220 and the information generated by the processor 240. According to various embodiments, the memory 230 may store information, a command, and/or an indication, for connection to the external electronic device.

In an embodiment, the memory 230 may include volatile memory or non-volatile memory, and may be implemented to be substantially the same as or similar to the memory 130 of FIG. 1.

According to an embodiment, the memory 230 may store a personal information protection mode algorithm for protecting content received from the external electronic device.

In an embodiment, the processor 240 may be included in the processor 120 of FIG. 1. In an embodiment, the processor 240 may include one or more processors.

In an embodiment, the processor 240 may provide overall control to the operations of the electronic device 201, and may be the same as the processor 120 of FIG. 1 or perform at least one function or operation performed by the processor 120.

According to various embodiments, the processor 240 may control to display content shared from the external electronic device or content stored in the memory on a display screen. In an embodiment, the processor 240 may determine that the content to be displayed on the screen requires personal information protection, based on the content satisfying a preset condition or based on a user input, and accordingly, the electronic device may execute a personal information protection mode. For example, when the content to be displayed on the screen includes confidential/private/secret-related information, the electronic device may determine that the content to be displayed on the screen requires personal information protection.

According to various embodiments, the processor 240 may identify the type of the content to which the personal information protection mode is to be applied. According to an embodiment, the electronic device may determine whether the type of the content is dynamic content (e.g., video and so on) or static content (e.g., text, image, and so on) based on a file extension of the content.

According to various embodiments, the processor 240 may copy the content into a plurality of frames, generate fake content, and insert the fake content into each of the copied frames to apply the privacy protection mode to the content, based on the identified type of the content being image, text, or video.

In an embodiment, the processor 240 may add fake content different from original content to the remaining part of each of the copied frames except for original content selected from the copied frame, based on identifying the type of the content as text.

In another embodiment, the processor 240 may modify each of some of the copied frames on a pixel-by-pixel basis, based on the type of the content being image. According to an embodiment, a different parameter (e.g., screen brightness, color, polarization, or the like) may be applied to a pixel at the same position in each frame.

In another embodiment, the processor 240 may identify a region of interest (ROI) of the original content and modify each of some of the copied frames to have a different ROI, based on the type of the content being graph.

According to various embodiments, the processor 240 may merge the original content and the plurality of frames added with the fake content, and display the merged content in the form of a video on the screen. According to an embodiment, user information about the electronic device may be watermarked on the merged content in the form of the video, so that when personal information is leaked, a leak path may be easily identified.

According to an embodiment, a threshold time per unit time during which the frames added with the fake content are displayed on the screen may be set to a time during which the user does not recognize the difference between the original content and the modified content with the eyes. According to an embodiment, the frequency of occurrence of frames including the original content may be set to be higher than the frequency of occurrence of the frames added with the fake content, so that the video is displayed on the screen to enable the user to perceive the same text as the original content. According to an embodiment, when the original content and a plurality of frames added with the fake content are randomly displayed on the screen during a unit time, the sum of times during which the plurality of frames added with the fake content are displayed on the screen may be set not to exceed the threshold time.

According to an embodiment, when the video displayed on the screen is shared with another external electronic device, captured by the electronic device, or taken as a picture or recorded as a video by another external electronic device such as a camera, a form different from the original content may be represented.

Figure 3:
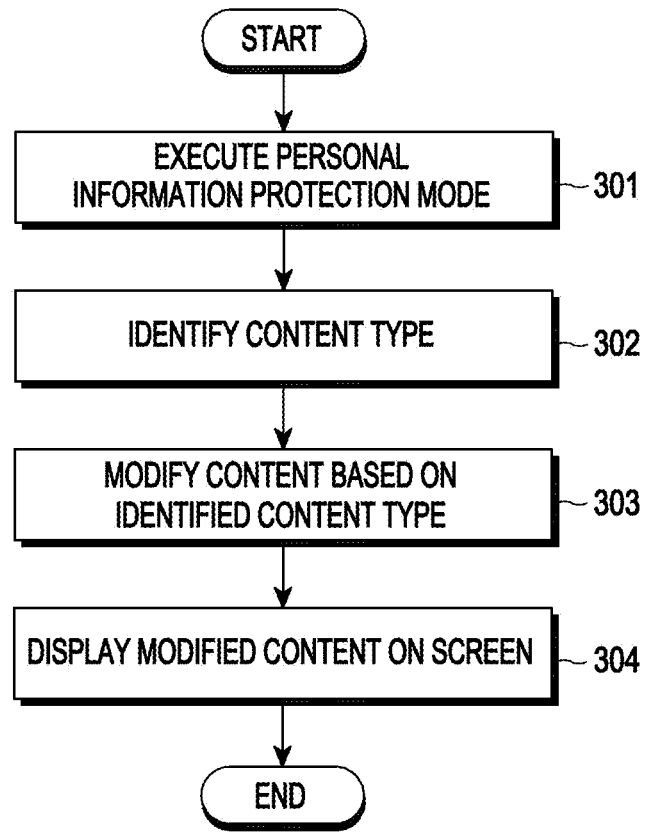
FIG. 3 is a diagram illustrating an operation of an electronic device according to an embodiment of the disclosure.

FIG. 3 is a diagram illustrating an operation of an electronic device according to an embodiment of the disclosure.

In an embodiment, the electronic device may be substantially the same as the electronic device 101 of FIG. 1 or the electronic device 200 of FIG. 2. In an embodiment, an external electronic device may be substantially the same as the electronic device 102 or the electronic device 104 of FIG. 1.

While static content such as text and an image is taken as an example of content in the disclosure, for convenience of description, it is evident that the same technical idea is also applicable to dynamic content such as a video. Further, text is described as written in alphabetic characters in the disclosure, by way of example. However, the text may cover other special symbols and various characters used in other languages. Further, while text and an image are described in separate embodiments in the disclosure, the disclosure is not limited thereto, and it is apparent to those skilled in the art that the same technical idea is applicable to a case in which different types of content are simultaneously displayed on a single screen.

Referring to FIG. 3, in operation 301, the electronic device may display content shared from the external electronic device or content stored in memory on a screen. In an embodiment, it may be determined that the content to be displayed on the screen requires personal information protection, based on the content satisfying a preset condition or based on a user input, and accordingly, the electronic device may execute the personal information protection mode. For example, when the content to be displayed on the screen includes confidential/private/secret-related information, the electronic device may determine that the content to be displayed on the screen requires personal information protection.

In operation 302, the electronic device may identify the type of the content to which the personal information protection mode is to be applied. According to an embodiment, the electronic device may determine whether the type of the content is dynamic content (e.g., video and so on) or static content (e.g., text, image, and so on) based on a file extension of the content.

In operation 303, the electronic device may apply the personal information protection mode to the content based on the identified type of the content. According to an embodiment, the content may be modified differently for each content type according to the application of the personal information protection mode. According to an embodiment, the electronic device may modify the content by inserting different fake content into original content based on the type of the content. According to an embodiment, user information about the electronic device may be watermarked on merged content in the form of a video so that when personal information is leaked, a leak path may be easily identified.

In operation 304, the electronic device may display the modified content on the screen. According to an embodiment, the modified content displayed on the screen may be displayed in a form that does not allow the difference from the original content to be distinguishable, and represented as a form different from the original content, when shared with another external electronic device, captured by the electronic device, or photographed or recorded by another external electronic device.

Figure 4A:
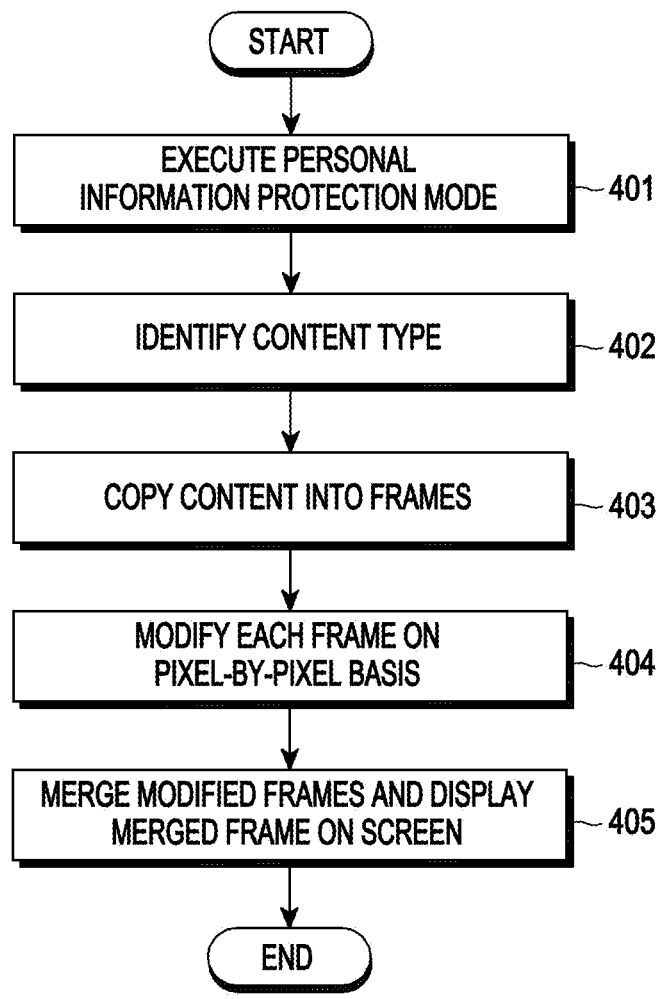
FIGS. 4A and 4B are diagrams illustrating an operation of an electronic device according to various embodiments of the disclosure.

FIG. 4A is a diagram illustrating an operation of an electronic device according to an embodiment of the disclosure.

In an embodiment, the electronic device may be substantially the same as the electronic device 101 of FIG. 1 or the electronic device 200 of FIG. 2. In an embodiment, an external electronic device may be substantially the same as the electronic device 102 or the electronic device 104 of FIG. 1.

Referring to FIG. 4A, in operation 401, the electronic device may display content shared from the external electronic device or content stored in memory on a screen. In an embodiment, it may be determined that the content to be displayed on the screen requires personal information protection, based on the content satisfying a preset condition or based on a user input, and accordingly, the electronic device may execute the personal information protection mode. For example, when the content to be displayed on the screen includes confidential/private/secret-related information, the electronic device may determine that the content to be displayed on the screen requires personal information protection.

In operation 402, the electronic device may identify the type of the content to which the personal information protection mode is to be applied. According to an embodiment, the electronic device may determine whether the type of the content is dynamic content (e.g., video and so on) or static content (e.g., text, image, and so on) based on a file extension of the content.

In operation 403, the electronic device may copy the content into a plurality of frames to apply the personal information protection mode to the content, based on the identified type of the content being image.

In operation 404, the electronic device may modify each of some of the copied frames on a pixel-by-pixel basis. According to an embodiment, a different parameter (e.g., screen brightness, color, polarization, or the like) may be applied to a pixel at the same position in each frame.

In operation 405, the electronic device may merge the original content and a plurality of frames modified on a pixel-by-pixel basis, and display the merged content in the form of a video on the screen. According to an embodiment, user information about the electronic device may be watermarked on the merged content in the form of the video, so that when personal information is leaked, a leak path may be easily identified.

According to an embodiment, a threshold time per unit time during which the frames modified on a pixel-by-pixel basis are displayed on the screen may be set to a time during which the user does not recognize the difference between the original content and the modified content with the eyes. According to an embodiment, the frequency of occurrence of frames including the original content may be set to be higher than the frequency of occurrence of the frames modified on a pixel-by-pixel basis, thereby displaying the video on the screen in a manner that does not allow the user to identify the difference from the original content. According to an embodiment, when the original content and the plurality of frames modified on a pixel-by-pixel basis are randomly displayed on the screen during a unit time, the sum of times during which the plurality of frames modified on a pixel-by-pixel basis are displayed on the screen may be set not to exceed the threshold time. For example, on the assumption that a final video displayed on the screen is 200 frames per second (fps), and the threshold time is 13 ms, it takes 5 ms to display one frame. Accordingly, the original content may be configured to be displayed in at least three frames (=three frames*5 ms=15 ms). According to an embodiment, the threshold time may be set according to a user input in the electronic device. In this case, when the user intends to hide part of the content, the frequency of occurrence of the frames representing the original content may be set to be low.

According to an embodiment, when the video displayed on the screen is shared with another external electronic device, captured by the electronic device, or taken as a picture or recorded as a video by another external electronic device such as a camera, the video may be represented in a form different from the original content.

Figure 4B:
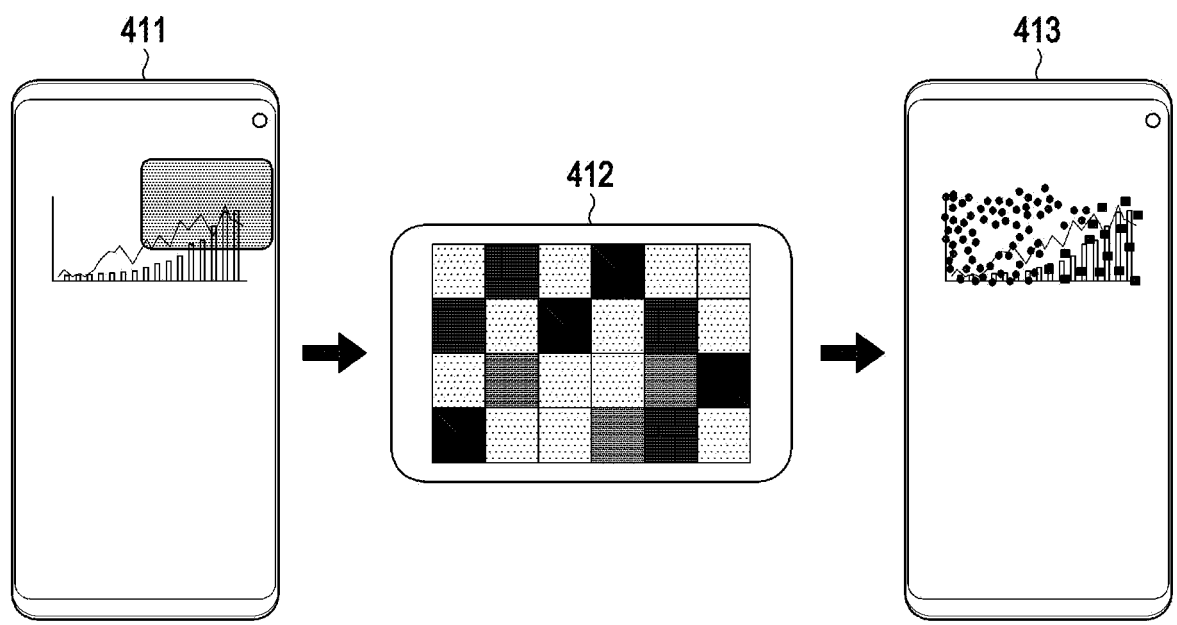

FIG. 4B is a diagram illustrating an operation of an electronic device according to an embodiment of the disclosure.

Referring to FIG. 4B, when content is displayed on a screen of the electronic device (411) and the personal information protection mode is executed under the control of a processor, the electronic device may identify that the type of the content to which the personal information protection mode is applied is image, and thus copy the content into a plurality of frames and modify a parameter for each frame on a pixel-by-pixel basis (412). The electronic device may merge frames for which the parameter has been modified on a pixel-by-pixel basis, and randomly display the merged frames together with original content on the screen. When the video displayed on the screen is shared with another external electronic device, captured by the electronic device, or taken as a picture or recorded as a video by another external device such as cameras, the video may be represented in a form different from the original content, as indicated by reference numeral 413 of FIG. 4B.

Figure 5A:
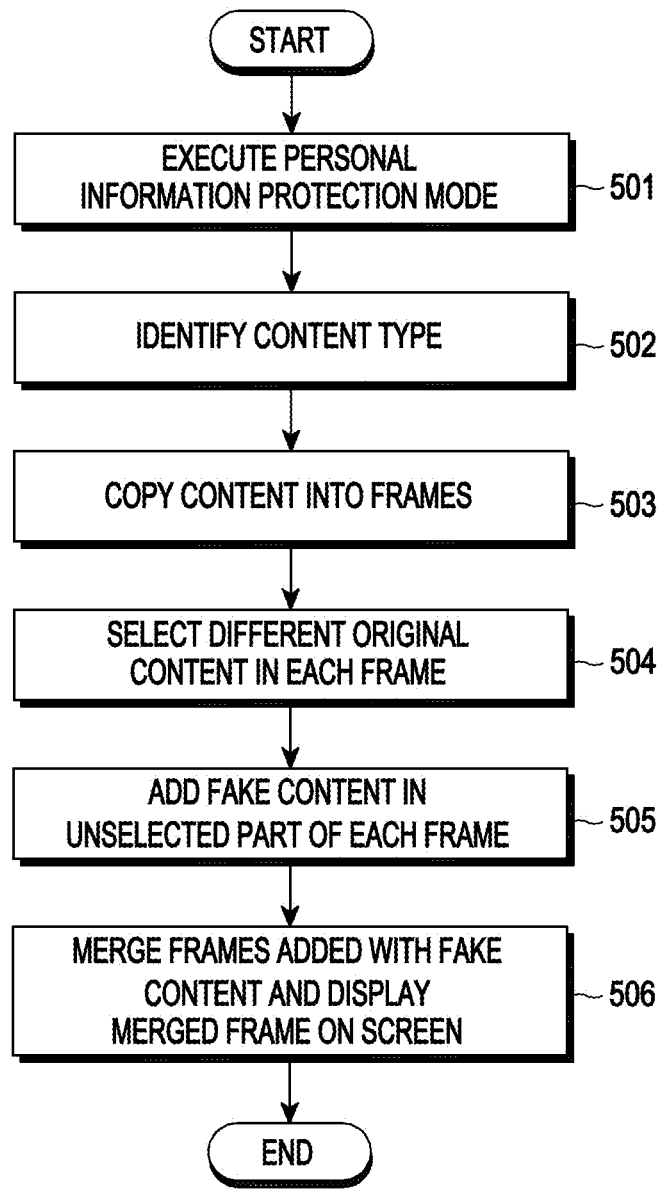
FIGS. 5A and 5B are diagrams illustrating an operation of an electronic device according to various embodiments of the disclosure.

FIG. 5A is a diagram illustrating an operation of an electronic device according to an embodiment of the disclosure.

In an embodiment, the electronic device may be substantially the same as the electronic device 101 of FIG. 1 or the electronic device 200 of FIG. 2. In an embodiment, the external electronic device may be substantially the same as the electronic device 102 or the electronic device 104 of FIG. 1.

Referring to FIG. 5A, in operation 501, the electronic device may display content shared from the external electronic device or content stored in memory on a screen. In an embodiment, it may be determined that the content to be displayed on the screen requires personal information protection, based on the content satisfying a preset condition or based on a user input, and accordingly, the electronic device may execute the personal information protection mode. For example, when the content to be displayed on the screen includes confidential/private/secret-related information, the electronic device may determine that the content to be displayed on the screen requires personal information protection.

In operation 502, the electronic device may identify the type of the content to which the personal information protection mode is to be applied. According to an embodiment, the electronic device may determine whether the type of the content is dynamic content (e.g., video and so on) or static content (e.g., text, image, and so on) based on a file extension of the content.

In operation 503, the electronic device may copy the content into a plurality of frames to apply the personal information protection mode to the content, based on the identified type of the content being text.

In operation 504, the electronic device may select different original content from each of the copied frames.

In operation 505, the electronic device may add fake content different from the original content to the remaining part of each of the copied frames except for the selected original content in the copied frame.

In operation 506, the electronic device may merge the original content and the plurality of frames added with the fake content, and display the merged content in the form of a video on the screen. According to an embodiment, user information about the electronic device may be watermarked on the merged content in the form of the video, so that when personal information is leaked, a leak path may be easily identified.

According to an embodiment, a threshold time per unit time during which the frames added with the fake content are displayed on the screen may be set to a time during which the user does not recognize the difference between the original content and the modified content with the eyes. According to an embodiment, the frequency of occurrence of frames including the original content may be set to be higher than the frequency of occurrence of the frames added with the fake content, thereby displaying the video on the screen in a manner that does not allow the user to identify the difference from the original content. According to an embodiment, when the original content and the plurality of frames added with the fake content are randomly displayed on the screen during a unit time, the sum of times during which the plurality of frames added with the fake content are displayed may be set not to exceed the threshold time.

For example, on the assumption that a final video displayed on the screen is 200 fps, and the threshold time is 13 ms, it takes 5 ms to display one frame. Accordingly, the original content may be configured to be displayed in at least three frames (=three frames*5 ms=15 ms). According to an embodiment, the threshold time may be set according to a user input in the electronic device. In this case, when the user intends to hide part of the content, the frequency of occurrence of the frames representing the original content may be set to be low.

According to an embodiment, when the video displayed on the screen is shared with another external electronic device, captured by the electronic device, or taken as a picture or recorded as a video by another external electronic device such as a camera, the video may be represented in a form different from the original content.

Figure 5B:
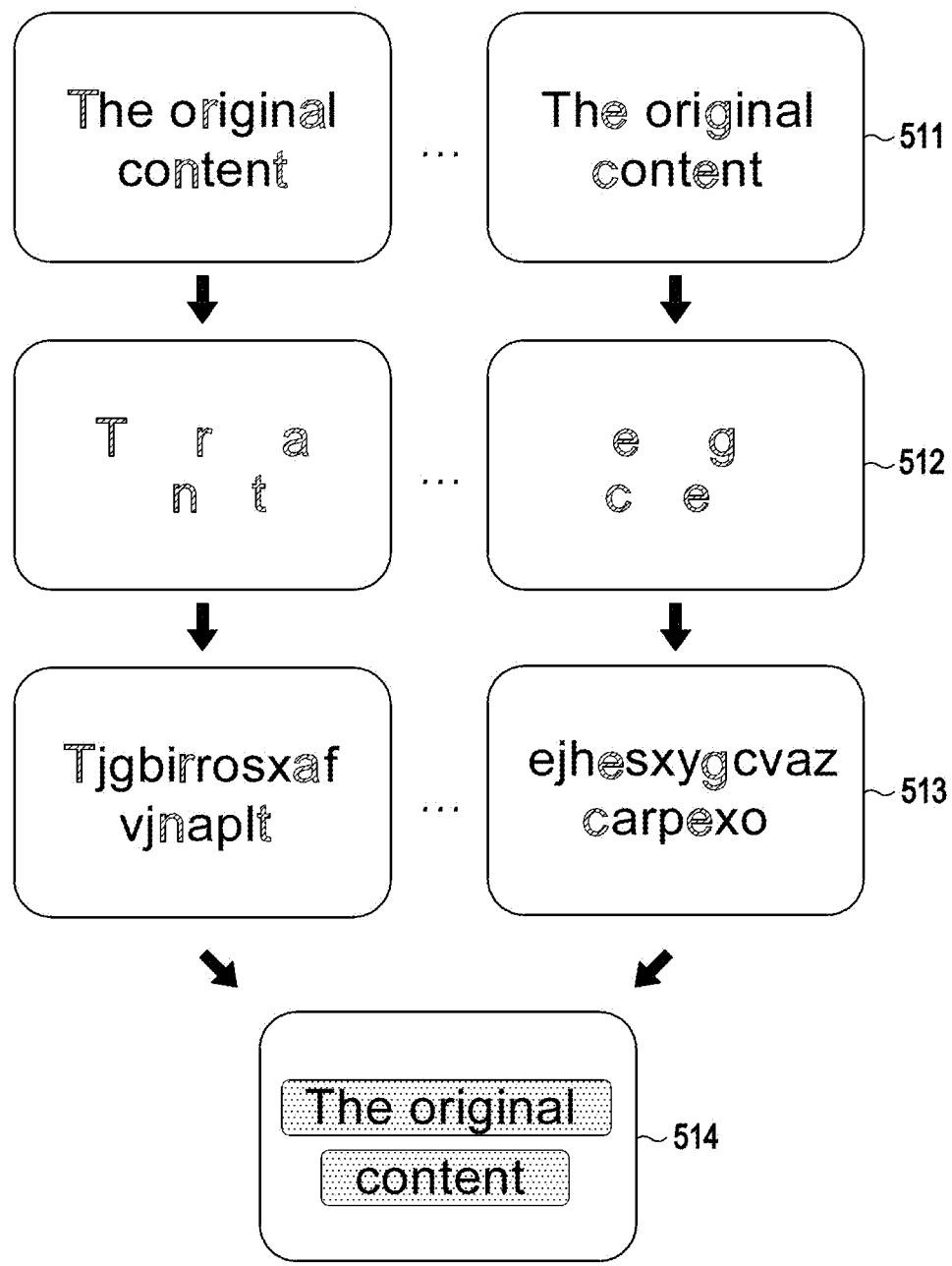

FIG. 5B is a diagram illustrating an operation of an electronic device according to an embodiment of the disclosure.

Referring to FIG. 5B, when original content is displayed on a screen of the electronic device, and the personal information protection mode is executed under the control of a processor, the electronic device may identify that the type of content to which the personal information protection mode is applied is text, and thus copy the content into a plurality of frames (511). In FIG. 5B, the original text displayed on the screen is "The original content."

The electronic device may select different original content from each of the copied frames (512). FIG. 5B illustrates a case in which "T," "r," "a," "n," and "t" are selected from the original content in the first frame, and "e," "g," "c," and "e" are selected from the original content in the last frame.

The electronic device may fill the remaining content except for the selected original content with fake content in each frame (513). FIG. 5B illustrates a case in which the remaining content except for the selected original content "T," "r," "a," "n," and "t" is filled with fake content in the first frame, and the remaining content except for the selected original content "e," "g," "c," and "e" is filled with fake content in the last frame.

The electronic device may merge the original content and the frames modified to include the fake content on the screen (514). In an embodiment, text of the content displayed on the screen is the same as text of the original content, when viewed by the user's eyes. However, when the content displayed on the screen is shared with another external electronic device, captured by the electronic device, or taken as a picture or recorded as a video by another external electronic device, the content may be represented as text different from the original content.

Figure 6A:
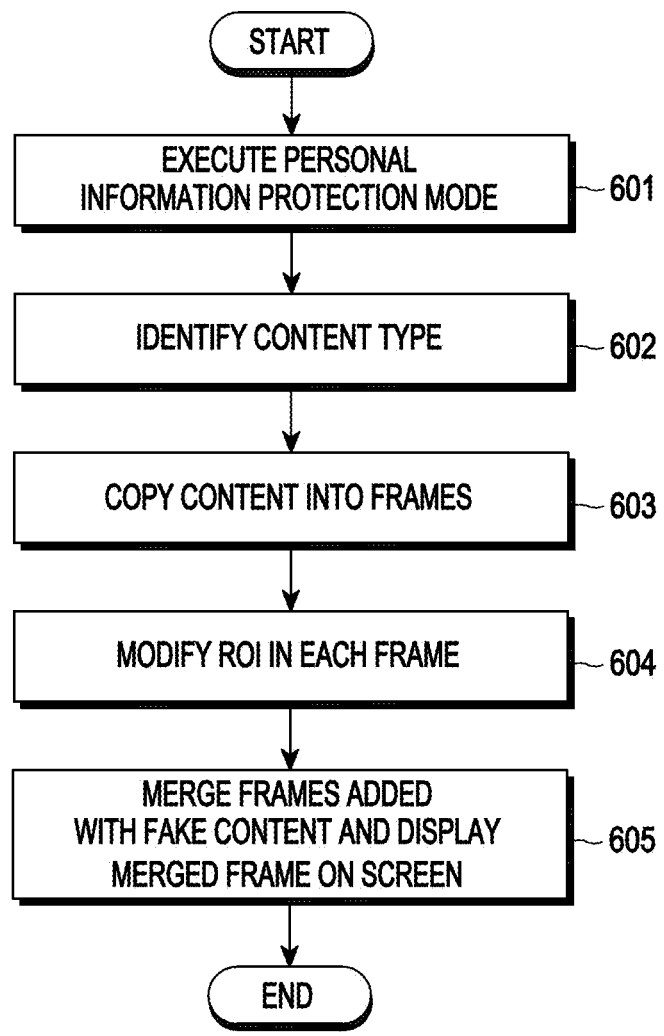
FIGS. 6A and 6B are diagrams illustrating an operation of an electronic device according to various embodiments of the disclosure.

FIG. 6A is a diagram illustrating an operation of an electronic device according to an embodiment of the disclosure.

In an embodiment, the electronic device may be substantially the same as the electronic device 101 of FIG. 1 or the electronic device 200 of FIG. 2. In an embodiment, the external electronic device may be substantially the same as the electronic device 102 or the electronic device 104 of FIG. 1.

Referring to FIG. 6A, in operation 601, the electronic device may display content shared from the external electronic device or content stored in memory on a screen. In an embodiment, it may be determined that the content to be displayed on the screen requires personal information protection, based on the content satisfying a preset condition or based on a user input, and accordingly, the electronic device may execute the personal information protection mode. For example, when the content to be displayed on the screen includes confidential/private/secret-related information, the electronic device may determine that the content to be displayed on the screen requires personal information protection.

In operation 602, the electronic device may identify the type of the content to which the personal information protection mode is to be applied. According to an embodiment, the electronic device may determine whether the type of the content is dynamic content (e.g., video and so on) or static content (e.g., text, image, and so on) based on a file extension of the content.

In operation 603, the electronic device may copy the content into a plurality of frames to apply the personal information protection mode to the content, based on the identified type of the content being graph.

In operation 604, the electronic device may identify a ROI of original content and modify each of some of the copied frames to have a different ROI.

In operation 605, the electronic device may merge the original content and a plurality of frames with the modified ROIs, and display the merged content in the form of a video on the screen. According to an embodiment, user information about the electronic device may be watermarked on the merged content in the form of the video, so that when personal information is leaked, a leak path may be easily identified.

According to an embodiment, a threshold time per unit time during which the frames with the modified ROIs are displayed on the screen may be set to a time during which the user does not recognize the difference between the original content and the modified content with the eyes. According to an embodiment, the frequency of occurrence of frames including the original content may be set to be higher than the frequency of occurrence of the frames with the modified ROIs, thereby displaying the video on the screen in a manner that does not allow the user to identify the difference from the original content. According to an embodiment, when the original content and the plurality of frames with the modified ROIs are randomly displayed on the screen during a unit time, the sum of times during which the plurality of frames with the modified ROIs are displayed may be set not to exceed the threshold time.

For example, on the assumption that a final video displayed on the screen is 200 fps, and the threshold time is 13 ms, it takes 5 ms to display one frame. Accordingly, the original content may be configured to be displayed in at least three frames (=three frames*5 ms=15 ms). According to an embodiment, the threshold time may be set according to a user input in the electronic device. In this case, when the user intends to hide part of the content, the frequency of occurrence of the frames representing the original content may be set to be low.

According to an embodiment, when the video displayed on the screen is shared with another external electronic device, captured by the electronic device, or taken as a picture or recorded as a video by another external electronic device such as a camera, a form different from the original content may be represented.

Figure 6B:
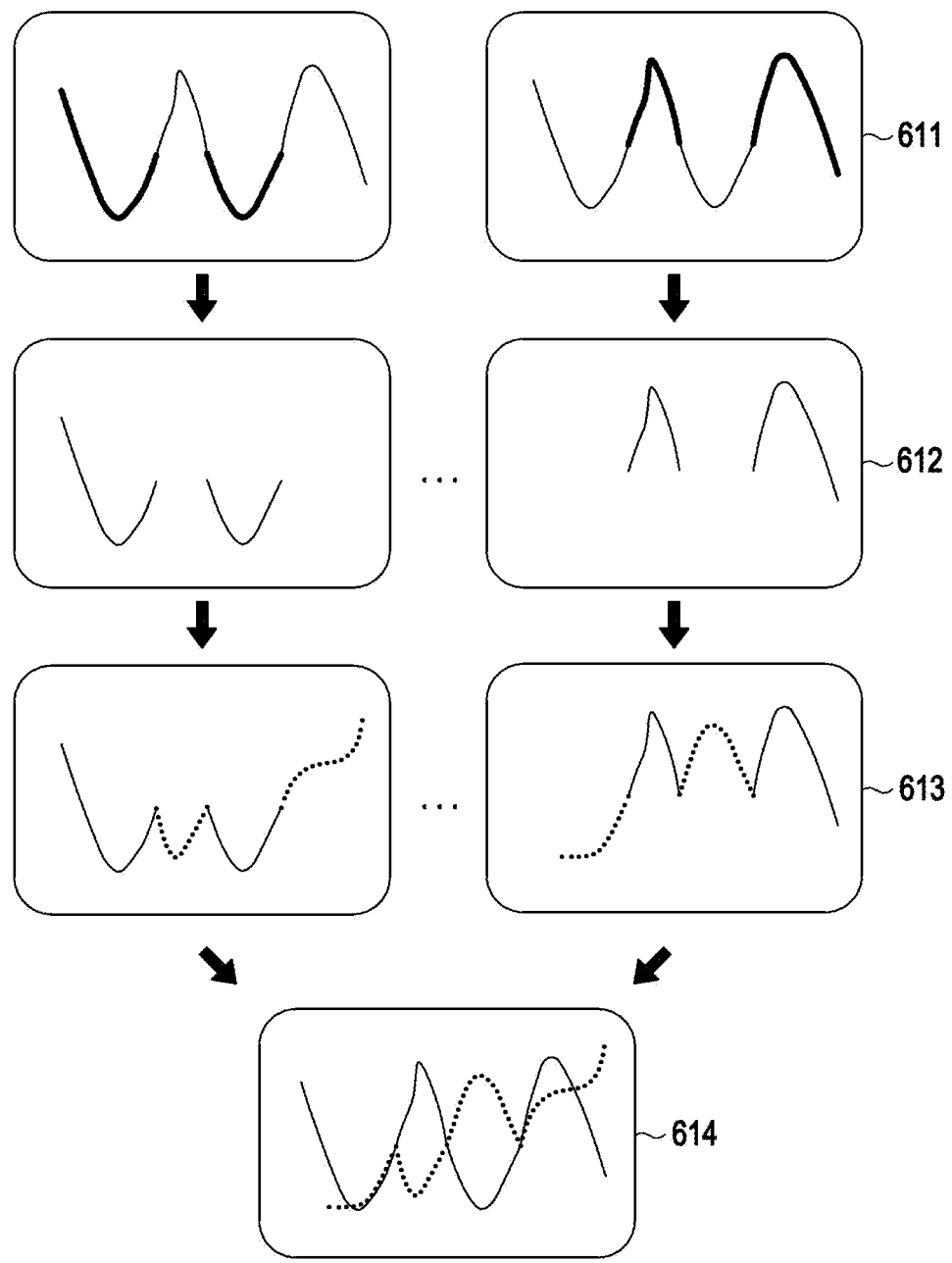

FIG. 6B is a diagram illustrating an operation of an electronic device according to an embodiment of the disclosure.

Referring to FIG. 6B, when content is displayed on a screen of the electronic device, and the personal information protection mode is executed under the control of a processor, the electronic device may identify that the type of content to which the personal information protection mode is to be applied is graph. Thus, the electronic device may copy the content into a plurality of frames (611) and select a different original part from each of the copied frames (612).

The electronic device may fill the remaining part except for the selected original part in each frame with a fake graph having a different slope from the original one (613).

The electronic device may merge the original graph and the frames modified to include the fake graphs and display the merged graph on the screen (S614).

In an embodiment, as the electronic device identifies the type of content to which the personal information protection mode is to be applied as video, the electronic device may modify partial content of each of a plurality of frames forming video content, and display a video obtained by merging the modified frames on the screen.

Figure 7:
FIG. 7 is a diagram illustrating an operation of an electronic device according to an embodiment of the disclosure.

FIG. 7 is a diagram illustrating an operation of an electronic device according to an embodiment of the disclosure.

Referring to FIG. 7, reference numeral 701 denotes content displayed on an electronic device, and reference numeral 702 denotes content obtained by capturing the content with the electronic device, or by taking a video as a picture or recording the video as a video with another external electronic device such as a camera. According to an embodiment, as the personal information protection mode is executed in the electronic device, original content may be modified according to each type of content. It may be noted from a comparison between the content 701 and the content 702 that the original content has been modified to an unrecognizable state.

Therefore, it is possible to prevent the risk of loss of important content through a screenshot and effectively cope with a shoulder surfing attack that may occur in a public place or a screenshot attempt from a malicious program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display; and
    at least one processor operatively coupled to the display, wherein the at least one processor is configured to:
        determine that content to be displayed on the display requires a personal information protection mode based on whether the content includes information being confidential, private, or secret,
        execute the personal information protection mode,
        identify, based on a file extension of the content, a type of the content displayed on the display is one of a dynamic video, a static image, a static text, or a static graph,
        copy the content into a plurality of frames,
        modify at least some frames of the plurality of frames based on the identified type of the content, and
        display a video obtained by merging the plurality of frames including the modified at least some frames on the display, and
    wherein, to modify the at least some frames of the plurality of frames based on the identified type of the content, the at least one processor is further configured to:
        based on determining that the content is the static text, select different texts for the plurality of frames and change unselected texts for the plurality of frames to other texts,
        based on determining that the content is the static graph, modify the at least some frames to have a different region of interest (ROI) from an ROI of a remaining frame among the plurality of frames of the content and fill remaining parts except for the ROIs of the plurality of frames with fake graphs having different slopes from the static graph of the content,
        based on determining that the content is the static image, modify a parameter for a pixel in each modified frame to be different from a parameter for a pixel at a same position in the content, and
        based on determining that the content is the dynamic video, modify a parameter for a pixel in each modified frame to be different from a parameter for a pixel at a same position in the content.

2. The electronic device of claim 1, wherein the at least one processor is further configured to:
    when displaying the video obtained by merging the plurality of frames including the modified at least some frames on the display, watermark user information about the electronic device; and
    display the watermarked user information together with the video on the display.

3. The electronic device of claim 1, wherein the at least one processor is further configured to, in response to displaying the video obtained by merging the plurality of frames, set a sum of times during which the modified at least some frames are displayed not to exceed a threshold time per unit time during which frames including same data as the content are displayed.

4. The electronic device of claim 3, wherein the at least one processor is further configured to set the threshold time to a time during which a difference between the content and the video obtained by merging the plurality of frames is not recognized by a human eye.

5. A method of operating an electronic device, the method comprising:
    determining that content to be displayed on a display requires a personal information protection mode based on whether the content includes information being confidential, private, or secret;
    executing the personal information protection mode;
    identifying, based on a file extension of the content, a type of the content displayed on the display is one of a dynamic video, a static image, a static text, or a static graph;
    copying the content into a plurality of frames;
    modifying at least some frames of the plurality of frames based on the identified type of the content; and
    displaying a video obtained by merging the plurality of frames including the modified at least some frames on the display,
    wherein the modifying of the at least some frames based on the identified type of the content comprises:
        based on determining that the content is the static text, selecting different texts for the plurality of frames and changing unselected texts for the plurality of frames to other text,
        based on determining that the content is the static graph, modifying the at least some frames to have a different region of interest (ROI) from an ROI of a remaining frame among the plurality of frames of the content and fill remaining parts except for the ROIs of the plurality of frames with fake graphs having different slopes from the static graph of the content,
        based on determining that the content is the static image, modify a parameter for a pixel in each modified frame to be different from a parameter for a pixel at a same position in the content, and
        based on determining that the content is the dynamic video, modify a parameter for a pixel in each modified frame to be different from a parameter for a pixel at a same position in the content.

6. The method of claim 5, wherein displaying the video obtained by merging the plurality of frames including the modified at least some frames on the display comprises:
    watermarking user information about the electronic device; and
    displaying the watermarked user information together with the video on the display.

7. The method of claim 5, wherein displaying the video obtained by merging the plurality of frames including the modified at least some frames on the display comprises setting a sum of times during which the modified at least some frames are displayed not to exceed a threshold time per unit time during which frames including same data as the content are displayed.

8. The method of claim 7, wherein the threshold time is set to a time during which a difference between the content and the video obtained by merging the plurality of frames is not recognized by a human eye.

* * * * *